US012434538B2

(12) United States Patent
Kim et al.

(10) Patent No.: US 12,434,538 B2
(45) Date of Patent: Oct. 7, 2025

(54) THERMAL MANAGEMENT SYSTEM FOR VEHICLE

(71) Applicant: Hanon Systems, Daejeon (KR)

(72) Inventors: Jae Hoon Kim, Daejeon (KR); Moo Joong Kim, Daejeon (KR); Hae Jun Lee, Daejeon (KR)

(73) Assignee: Hanon Systems, Daejeon (KR)

(*) Notice: Subject to any disclaimer, the term of this patent is extended or adjusted under 35 U.S.C. 154(b) by 13 days.

(21) Appl. No.: 18/280,167

(22) PCT Filed: Jul. 25, 2022

(86) PCT No.: PCT/KR2022/010889
§ 371 (c)(1),
(2) Date: Sep. 1, 2023

(87) PCT Pub. No.: WO2023/018062
PCT Pub. Date: Feb. 16, 2023

(65) Prior Publication Data
US 2024/0140172 A1 May 2, 2024

(30) Foreign Application Priority Data
Aug. 9, 2021 (KR) .................. 10-2021-0104458

(51) Int. Cl.
B60H 1/00 (2006.01)
B60H 1/14 (2006.01)

(52) U.S. Cl.
CPC ..... B60H 1/00921 (2013.01); B60H 1/00278 (2013.01); B60H 1/143 (2013.01);
(Continued)

(58) Field of Classification Search
CPC ............ B60H 1/00278; B60H 1/00921; B60H 1/00385; B60H 1/00885; B60H 1/00899;
(Continued)

(56) References Cited

U.S. PATENT DOCUMENTS

2020/0047591 A1* 2/2020 He .................... B60H 1/32284
2021/0080016 A1 3/2021 Wong

FOREIGN PATENT DOCUMENTS

CN 105916711 A 8/2016
JP 2018-159378 A 10/2018
(Continued)

OTHER PUBLICATIONS

Machine translation KR1020210027675 (Year: 2021).*
International Search Report dated Nov. 24, 2022.

Primary Examiner — Joseph F Trpisovsky
(74) Attorney, Agent, or Firm — Dickinson Wright PLLC

(57) ABSTRACT

A vehicle thermal management system including a heating heat exchanger which exchanges heat with air within an air-conditioning case to heat the air, and a cooling heat exchanger which exchanges heat with air to cool the air; a refrigerant line circulating through a compressor, a condenser, an expansion valve, and a chiller; a first coolant line that passes through the heating heat exchanger and exchanges heat with the condenser of the refrigerant line; a second coolant line that passes through the cooling heat exchanger and exchanges heat with the chiller of the refrigerant line; a radiator that exchanges heat between the coolant and outside air; a third coolant line that passes through the radiator and exchanges heat with a battery of a vehicle; and a mixing tank provided to mix the coolant of the first coolant line, the second coolant line, and the third coolant line.

15 Claims, 12 Drawing Sheets

(52) U.S. Cl.
CPC .............. *B60H 2001/00307* (2013.01); *B60H 2001/00928* (2013.01); *B60H 2001/00935* (2013.01)

(58) Field of Classification Search
CPC .... B60H 1/143; B60H 1/323; B60H 1/32284; B60H 2001/00307; B60H 2001/00928; B60H 2001/00935
See application file for complete search history.

(56) References Cited

FOREIGN PATENT DOCUMENTS

| | | |
|---|---|---|
| KR | 10-2018-0136633 A | 12/2018 |
| KR | 10-1934360 B1 | 3/2019 |
| KR | 10-2021-0027675 A | 3/2021 |

\* cited by examiner

THERMAL MANAGEMENT SYSTEM FOR VEHICLE

RELATED APPLICATIONS

This application is a U.S. National Stage of International Patent Application Serial No. PCT/KR2022/010889, filed Jul. 25, 2022, which claims the benefit of Korean Patent Application Serial No. 10-2021-0104458, filed Aug. 9, 2021. The entire disclosures of each of the above applications are incorporated herein by reference.

FIELD

The present invention relates to a vehicle thermal management system, and more specifically, to a vehicle thermal management system which is installed in an electric vehicle to perform air conditioning in the interior of the vehicle and integratively perform thermal management of a battery and electronic units of the vehicle.

BACKGROUND

In general, an air conditioner for a vehicle includes a cooling system for cooling the interior of a vehicle and a heating system for heating the interior of the vehicle. The cooling system is configured to cool the interior of the vehicle by exchanging heat between refrigerant flowing in an evaporator and air passing through the evaporator. Additionally, the heating system is configured to heat the interior of the vehicle by exchanging heat between coolant flowing in a heater core and air passing through the heater core.

Recently, in a case of a vehicle which uses a battery like an electric vehicle, a heat pump system for a vehicle which cools the battery together with waste heat of electronic parts using a chiller, which exchanges heat between coolant and refrigerant has been used. Consequently, the heat pump system improves heat pump performance by recovering an air heat source through an outdoor unit, waste heat of the electronic parts through a water-refrigerant heat exchanger (chiller), and waste heat of the battery during the operation of the heat pump.

A conventional thermal management system for an electric vehicle is a direct heating type heat pump system which directly uses heat of refrigerant for heating. Accordingly, the conventional thermal management system has several disadvantages in that the configuration of the system for realizing cooling and heating is complicated, weight and manufacturing costs are increased due to an increase of the number of components, a refrigerant charging amount is increased. Furthermore, the conventional thermal management system is difficult to modularize the components since the components for refrigerant must be dispersed to make the system operate well, so is deteriorated in vehicle assemblability.

SUMMARY

Accordingly, the present invention has been made in view of the above-mentioned problems occurring in the related art, and it is an object of the present invention to provide a vehicle thermal management system which can reduce power consumption of an electric compressor, simplify lines, and reduce weight and cost by reducing the number of heat exchangers and refrigerant valves.

It is another object of the present invention to provide a vehicle thermal management system which can realize various air-conditioning modes, improve heat pump heating performance, heat the interior of the vehicle only with waste heat of electronic parts and a battery, and warm up the battery just by a heat pump.

Technical Solution

To accomplish the above-mentioned objects, according to the present invention, there is provided a vehicle thermal management system including: a heating heat exchanger which exchanges heat with air within an air-conditioning case to heat the air, and a cooling heat exchanger which exchanges heat with air to cool the air; a refrigerant line circulating through a compressor, a condenser, an expansion valve, and a chiller; a first coolant line that passes through the heating heat exchanger and exchanges heat with the condenser of the refrigerant line; a second coolant line that passes through the cooling heat exchanger and exchanges heat with the chiller of the refrigerant line; a radiator that exchanges heat between the coolant and outside air; a third coolant line that passes through the radiator and exchanges heat with a battery of a vehicle; and a mixing tank provided to mix the coolant of the first coolant line, the second coolant line, and the third coolant line.

The mixing tank is a single unit that integrates a coolant storage function and a valve function.

The mixing tank mixes the coolant depending on operational modes in a case in which coolant temperature of the battery side and coolant temperature of the chiller side are different.

The first coolant line passes through an electronic part of the vehicle.

The vehicle thermal management system further includes a first valve located among the radiator, electronic parts, mixing tank, and chiller, wherein the first valve makes the coolant passing through the radiator selectively flow to the electronic part or the chiller, or makes the coolant passing through the mixing tank selectively flow to the chiller or electronic part.

The vehicle thermal management system further includes a second valve provided among the electronic part, the condenser, the heating heat exchanger, and the radiator, wherein the second valve makes the coolant passing through the electronic part selectively flow to the condenser or the mixing tank, or makes the coolant passing through the heating heat exchanger selectively flow to the radiator or the condenser.

The vehicle thermal management system further includes a third valve provided among the second valve, the radiator, the chiller, and the cooling heat exchanger, wherein the third valve makes the coolant passing through the second valve selectively flow to the radiator or the cooling heat exchanger, or makes the coolant passing through the chiller selectively flow to the cooling heat exchanger or the radiator.

The vehicle thermal management system further includes a fourth valve provided among the mixing tank, the second valve, the third valve, and the battery, wherein the fourth valve makes the coolant passing through the battery selectively flow to the third valve or the mixing tank, or makes the coolant passing through the second valve selectively flow to the mixing tank or the battery.

The vehicle thermal management system further includes a fifth valve provided among the battery, the first valve, the electronic part, and the mixing tank, wherein the fourth valve makes the coolant passing through the first valve flow to the battery, or makes the coolant passing through the mixing tank selectively flow to the battery or the electronic part, or makes the coolant passing through the battery flow to the electronic part.

Each of the mixing tanks is connected to the cooling heat exchanger, the first valve, the fourth valve, and the fifth valve, and has a door rotating inside. Depending on the rotation of the door, the flow passages inside the mixing tank are divided or connected, performing a coolant mixing function and a passage switching function.

Depending on the rotation of the door, the cooling heat exchanger and the first valve are communicated, or the fourth valve and the fifth valve are communicated, or the first valve and the fourth valve are communicated, or the cooling heat exchanger and the fifth valve are communicated, or the cooling heat exchanger, the first valve, the fourth valve, and the fifth valve are all communicated.

In an indoor cooling mode, the first valve connects the radiator and the electronic part, and connects the mixing tank and the chiller, the second valve connects the electronic part and the condenser, and connects the heating heat exchanger and the radiator, the third valve connects the heating heat exchanger and the radiator, and connects the chiller and the cooling heat exchanger. The mixing tank connects the cooling heat exchanger and the first valve, the fourth valve makes the coolant passing through the battery flow to the radiator after passing the third valve, and the fifth valve makes the coolant passing through the radiator flow to the battery, thereby cooling the battery with outside air.

In an indoor cooling mode, the first valve connects the radiator and the electronic part, and connects the mixing tank and the chiller, the second valve connects the electronic part and the condenser, and connects the heating heat exchanger and the radiator, the third valve connects the heating heat exchanger and the radiator, and connects the chiller and the cooling heat exchanger. The mixing tank connects the first valve and the fourth valve, and connects the cooling heat exchanger and the fifth valve, the fourth valve makes the coolant passing through the battery flow to the mixing tank, and the fifth valve makes the coolant passing through the mixing tank flow to the battery, thereby cooling the battery with the chiller.

The mixing tank connects the first valve and the fourth valve, and connects the cooling heat exchanger and the fifth valve, wherein a communication area of the first valve and the fourth valve and a communication area of the cooling heat exchanger and the fifth valve are mixed, thereby cooling the battery with mixed coolant.

In an indoor heating mode, the first valve connects the radiator and the electronic part, and connects the mixing tank and the chiller, the second valve connects the electronic part and the mixing tank, and connects the heating heat exchanger and the condenser, the third valve connects the chiller and the radiator, and connects the electronic part and the cooling heat exchanger. The mixing tank connects the first valve and the fourth valve, and the fourth valve makes the coolant passing through the electronic part flow into the mixing tank after passing the second valve, thereby absorbing heat through the outside air and the electronic part.

In an indoor heating mode, the first valve connects the radiator and the electronic part, and connects the mixing tank and the chiller, the second valve connects the electronic part and the mixing tank, and connects the heating heat exchanger and the condenser, the third valve connects the chiller and the radiator, and connects the electronic part and the cooling heat exchanger. The mixing tank connects the first valve and the fourth valve, and the fourth valve makes the coolant passing through the electronic part flow into the mixing tank after passing the second valve, makes the coolant passing through the battery flow to the mixing tank, and the fifth valve makes the coolant passing through the radiator flow to the battery, thereby absorbing heat through the outside air, the electronic part, and battery.

Advantageous Effects

The vehicle thermal management system according to the present invention is capable of not only cooling, heating, and dehumidification of the interior of the vehicle, but also cooling and heat absorption of electronic parts and cooling and temperature-rising of the battery. Furthermore, the vehicle thermal management system can reduce power consumption of an electric compressor since including an actively controlled individual cooling system based on a heat generation rate of the battery.

Furthermore, the system can deflate by expanding and contracting according to a change in temperature of coolant in a specific operation mode due to the configuration of a mixing tank. Additionally, the system according to the present invention can simplify the configuration of the refrigerant line, and secure price competitiveness by reducing the number of heat exchangers and refrigerant valves.

Meanwhile, the system according to the present invention can improve heating performance of the heat pump since the water-cooled evaporator performs outdoor heat absorption and the chiller performs waste heat absorption of the electronic parts and the battery during the heating operation of the heat pump. In addition, the system according to the present invention can heat the interior of the vehicle only with waste heat of the electronic parts and the battery, and warm up the battery through the heat pump.

DETAILED DESCRIPTION

Hereinafter, referring to the attached drawings, the technical configuration of a thermal management system for a vehicle according to an embodiment of the present invention will be described in detail as follows.

Figure 1:
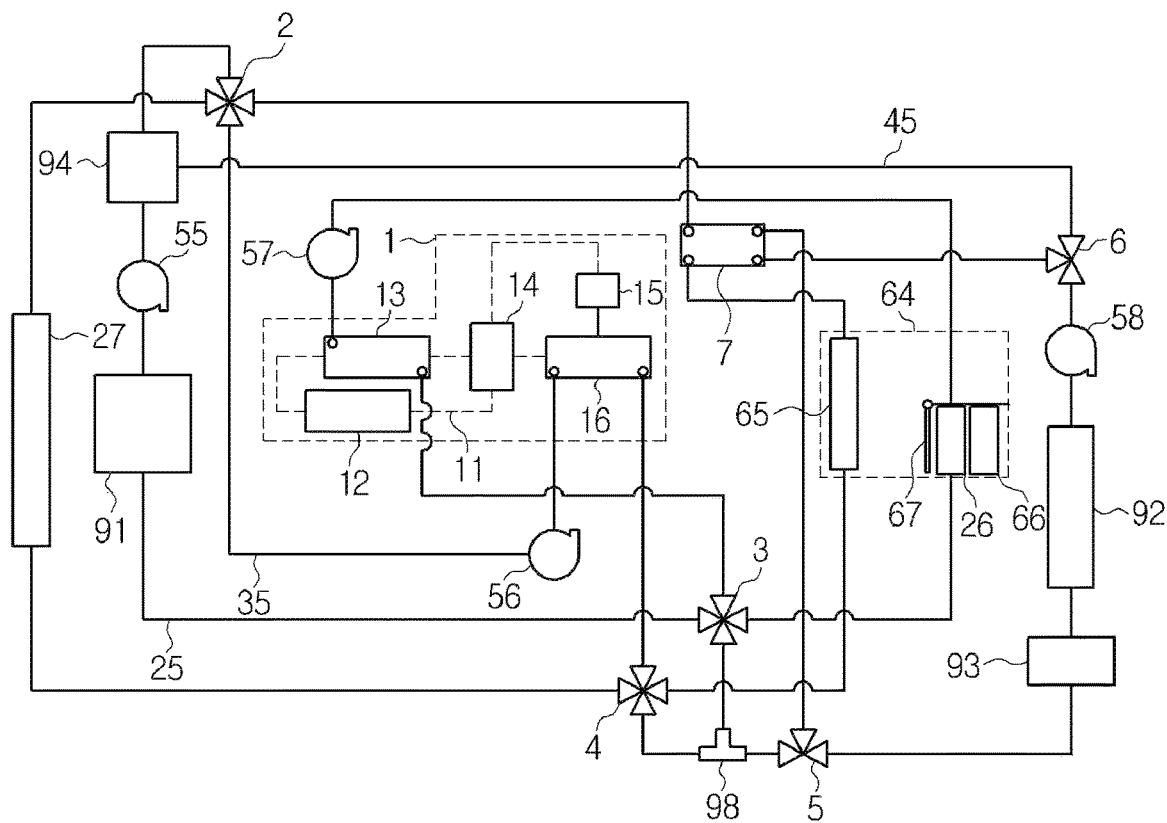
FIG. 1 is a schematic diagram of the vehicle thermal management system according to an embodiment of the present invention.
Figure 2:
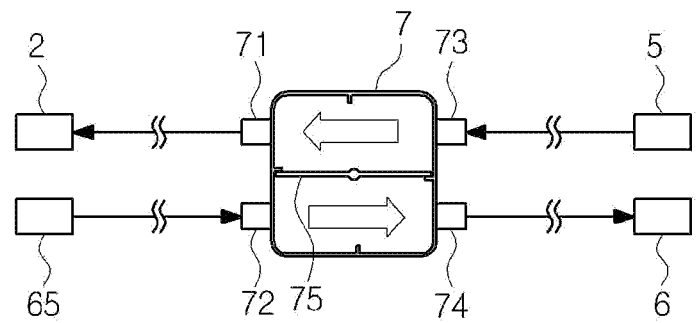
FIG. 2 illustrates a mixing tank according to an embodiment of the present invention.
Figure 2:
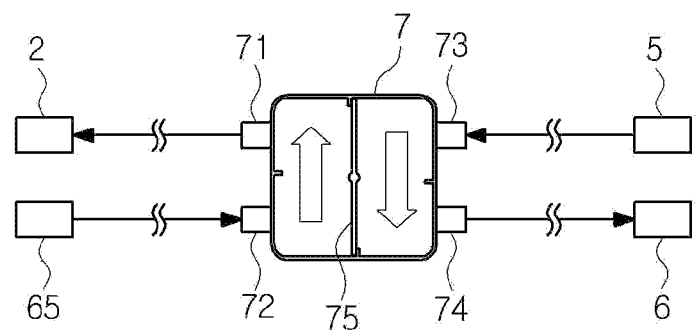
Figure 2:
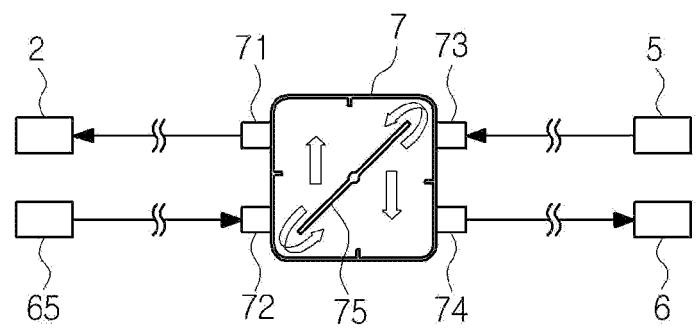
Figure 3:
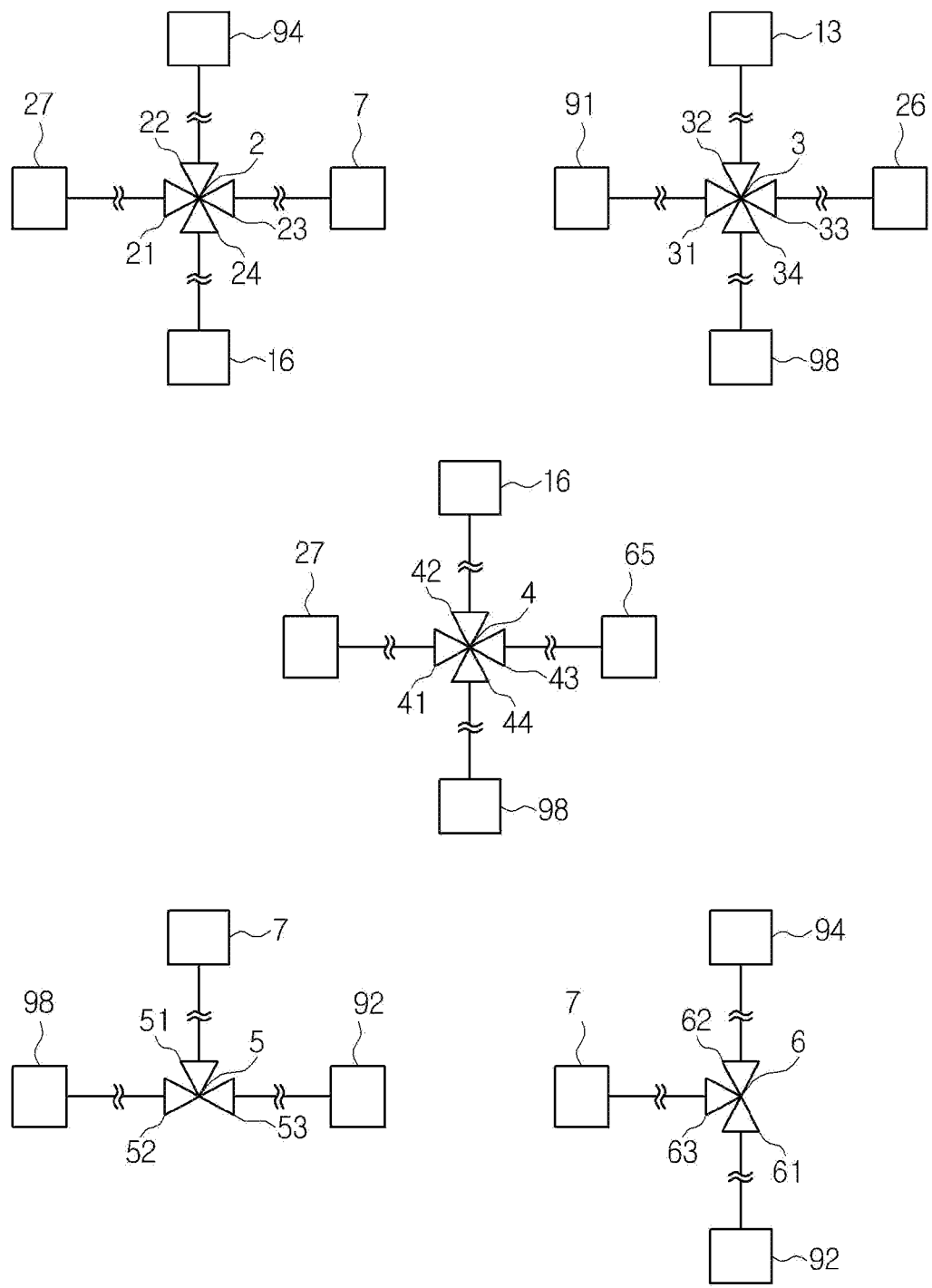
FIG. 3 illustrates a first valve to a fifth valve according to an embodiment of the present invention.

As illustrated in FIGS. 1 to 3, the thermal management system for a vehicle according to the present invention is installed in an electric vehicle or the like, and includes a heating heat exchanger 26, a cooling heat exchanger 65, a refrigerant module 1, a first coolant line 25, a second coolant line 35, a radiator 27, a third coolant line 45, a mixing tank 7, a first valve 2, a second valve 3, a third valve 4, a fourth valve 5, and a fifth valve 6.

Inside an air-conditioning case 64, the cooling heat exchanger 65 and the heating heat exchanger 26 are sequentially installed in an air flow direction. The heating heat exchanger 26 exchanges heat with air in the air-conditioning case 64 to heat the air, and the cooling heat exchanger 65 exchanges heat with the air in the air-conditioning case 64 to cool the air. The downstream side of the heating heat exchanger 26 is equipped with an electric heater 66, such as a PTC heater which generates heat according to the application of power. A temperature door 67 for adjusting discharge temperature by adjusting the opening degree of a warm air passage and a cold air passage is provided between the cooling heat exchanger 65 and the heating heat exchanger 26.

The refrigerant module 1 includes a refrigerant line 11 which circulates a compressor 12, a condenser 13, an expansion valve 15, and a chiller 16. The compressor 12 sucks and compresses refrigerant, and then, discharges the compressed refrigerant in a high-temperature and high-pressure gaseous state. The condenser 13 is a water-cooled condenser that exchanges heat between the refrigerant and the coolant. The expansion valve 15 expands the refrigerant that has passed through the condenser 13 in a low-temperature and low-pressure state. The chiller 16 is a water-cooled evaporator that exchanges heat between the refrigerant and the coolant. An internal heat exchanger 14 is provided between the condenser 13 and the expansion valve 15 and between the chiller 16 and the compressor 12.

The first coolant line 25 passes through the heating heat exchanger 26 and exchanges heat with the condenser 13 of the refrigerant line 11. A reserve tank 94, a first pump 55, and an electronic part 91 are provided in the first coolant line 25. Additionally, a second pump 57 is provided between the condenser 13 and the heating heat exchanger 26 in the first coolant line 25. The second coolant line 35 passes through the cooling heat exchanger 65 and exchanges heat with the chiller 16 of the refrigerant line 11. A third pump 56 is provided in the second coolant line 35.

The radiator 27 is a combined air-cooled condenser that exchanges heat between the coolant and outdoor air. The third coolant line 45 passes through the radiator 27 and exchanges heat with a battery 92 of the vehicle. The third coolant line 45 branches off from the first coolant line 25 of a reserve tank 94 towards the electronic part 91 and passes through the battery 92. The third coolant line 45 includes a fourth pump 58 and a coolant heater 93.

The mixing tank 7 is configured to mix coolant of the first coolant line 25, the second coolant line 35, and the third coolant line 45. Additionally, the mixing tank 7 is configured as a single unit to integrate a coolant storage function and a valve function. Moreover, depending on modes, the mixing tank 7 mixes the coolant in a case in which temperature of the coolant on the battery 92 side and temperature of coolant on the chiller 16 side are different from each other.

The first valve 2 is provided among the radiator 27, the front-end component 91, the mixing tank 7, and the chiller 16. The first valve 2 makes the coolant that has passed through the radiator 27 selectively flow to the electronic part 91 or the chiller 16, or the coolant that has passed through the mixing tank 7 selectively flow to the chiller 16 or the electronic part 91. The first valve 2 is a four-way valve.

That is, the first valve 2 includes a first connector 21, a second connector 22, a third connector 23, and a fourth connector 24. The first connector 21 is connected to the radiator 27, and the second connector 22 is connected to a reserve tank 94. Moreover, the third connector 23 is connected to the mixing tank 7, and the fourth connector 24 is connected to the chiller 16. The coolant that has passed through the radiator 27 is introduced through the first connector 21 and discharged through the second connector 22 or the fourth connector 24. Additionally, the coolant that has passed through the mixing tank 7 is introduced through the third connector 23 and discharged through the fourth connector 24.

The second valve 3 is installed between the electronic part 91, the condenser 13, the heating heat exchanger 26, and the radiator 27. The second valve 3 makes the coolant that has passed through the main components 91 selectively flow to the condenser 13 or the mixing tank 7, or the coolant that has passed through the heating heat exchanger 26 selectively flow to the radiator 27 or the condenser 13. The second valve 3 is a four-way valve.

That is, the second valve 3 includes a first connector 31, a second connector 32, a third connector 33, and a fourth connector 34. The first connector 31 is connected to the electronic part 91, the second connector 32 is connected to the condenser 13. Furthermore, the third connector 33 is connected to the heating heat exchanger 26, and the fourth connector 34 is connected to a connection unit 98. The connection unit 98 connects three coolant lines in three directions to connect the second valve 3, the third valve 4, and the fourth valve 5 to each other. Coolant that has passed through the electronic part 91 is introduced into the first connector 31 and is discharged to either the second connector 32 or the fourth connector 34. Similarly, coolant that has passed through the heating heat exchanger 26 is introduced into the third connector 33 and is discharged to the fourth connector 34 or the second connector 32.

The third valve 4 is installed between the second valve 3, the radiator 27, the chiller 16, and the cooling heat exchanger 65. The third valve 4 makes the coolant that has passed through the second valve 3 selectively flow to the radiator 27 or the cooling heat exchanger 65, or makes coolant that has passed through the chiller 16 selectively flow to the cooling heat exchanger 65 or the radiator 27. The third valve 4 is also a four-way valve.

That is, the third valve 4 includes a first connector 41, a second connector 42, a third connector 43, and a fourth connector 44. The first connector 41 is connected to the radiator 27, and the second connector 42 is connected to the chiller 16. Moreover, the third connector 43 is connected to the cooling heat exchanger 65, and the fourth connector 44 is connected to the connection unit 98. Coolant that has passed through the connection unit 98 is introduced into the fourth connector 44, and is discharged to the first connector 41 or the third connector 43. In addition, coolant that has passed through the chiller 16 is introduced into the second connector 42, and is discharged to the third connector 43 or the first connector 41.

In addition, the fourth valve 5 is provided between the mixing tank 7, the second valve 3, the third valve 4, and the battery 92. The fourth valve 5 makes coolant that has passed through the battery 92 selectively flow to the third valve 4 or the mixing tank 7, or makes coolant that has passed through the second valve 3 selectively flow to the mixing tank 7 or the battery 92. Additionally, the fourth valve 5 is a three-way valve.

That is, the fourth valve 5 has a first connector 51, a second connector 52, and a third connector 53. The first connector 51 is connected to the mixing tank 7, the second connector 52 is connected to the connection unit 98, and the third connector 53 is connected to the battery 92. Coolant that has passed through the battery 92 is introduced into the third connector 53 and discharged to the second connector 52 or the first connector 51. Additionally, coolant that has passed through the connection unit 98 is introduced into the second connector 52 and discharged to the first connector 51 or the third connector 53.

The fifth valve 6 is provided among the battery 92, the first valve 2, the electronic part 91, and the mixing tank 7. The fifth valve 6 makes coolant that has passed through the first valve 2 flow to the battery 92, or makes coolant that has passed through the mixing tank 7 selectively flow to the battery 92 or the powertrain component 91, or make coolant that has passed through the battery 92 flow to the electronic part 91. Additionally, the fifth valve 6 is a three-way valve.

That is, the fifth valve 6 has a first connector 61 connected to the battery 92, a second connector 62 connected to the reserve tank 94, and a third connector 63 connected to the mixing tank 7. Coolant that has passed through the reserve tank 94 is introduced into the second connector 62 and discharged to the first connector 61. Additionally, coolant that has passed through the mixing tank 7 is introduced into the third connector 63 and discharged to the first connector 61 or the second connector 62. Additionally, coolant that has passed through the battery 92 is introduced into the first connector 61 and discharged to the second connector 62.

In more detail, the mixing tank 7 is connected to a cooling heat exchanger 65, a first valve 2, a fourth valve 5, and a fifth valve 6. That is, the mixing tank 7 has a first connector 71, a second connector 72, a third connector 73, and a fourth connector 74. The first connector 71 is connected to the first valve 2, the second connector 72 is connected to the cooling heat exchanger 65. Additionally, the third connector 73 is connected to the fourth valve 5, and the fourth connector 74 is connected to the fifth valve 6.

Furthermore, the mixing tank 7 is equipped with a rotatable door 75 inside. The door 75 has a rotary shaft disposed at the center thereof, and is in the form of a plate extended on both sides of the rotary shaft. Depending on the rotation of the door 75, the flow passages inside the mixing tank 7 are divided or connected, performing a coolant mixing function and a passage switching function.

That is, as illustrated in FIG. 2, when the door 75 is in the position, the first connector 71 and the third connector 73 are communicated with each other, and the second connector 72 and the fourth connector 74 are communicated with each other. In this case, the communication passage of the first connector 71 and the third connector 73 and the communication passage of the second connector 72 and the fourth connector 74 are partitioned from each other.

Additionally, as illustrated in the middle of FIG. 2, when the door 75 is rotated 90 degrees, the first connector 71 and the second connector 72 are communicated with each other, and the third connector 73 and the fourth connector 74 are communicated with each other. In this case, the communication passage of the first connector 71 and the second connector 72 and the communication passage of the third connector 73 and the fourth connector 74 are partitioned from each other.

In addition, as illustrated at the bottom of FIG. 2, when the door 75 is rotated 45 degrees, the first connector 71 and the second connector 72 are communicated with each other, and the third connector 73 and the fourth connector 74 are communicated with each other. In this case, the communication passage of the first connector 71 and the second connector 72 and the communication passage of the third connector 73 and the fourth connector 74 communicate with each other, so that coolant of the communication passage of the first connector 71 and the second connection 72 and coolant of the communication passage of the third connector 73 and the fourth connector 74 are mixed together.

As described above, depending on the rotation of the door 75, the cooling heat exchanger 65 and the first valve 2 are communicated, or the fourth valve 5 and the fifth valve 6 are communicated, or the first valve 2 and the fourth valve 5 are communicated, or the cooling heat exchanger 65 and the fifth valve 6 are communicated. Alternatively, the cooling heat exchanger 65, the first valve 2, the fourth valve 5, and the fifth valve 6 are all communicated.

Hereinafter, referring to FIGS. 4 to 12, operational examples of air-conditioning modes will be described in more detail.

Figure 4:
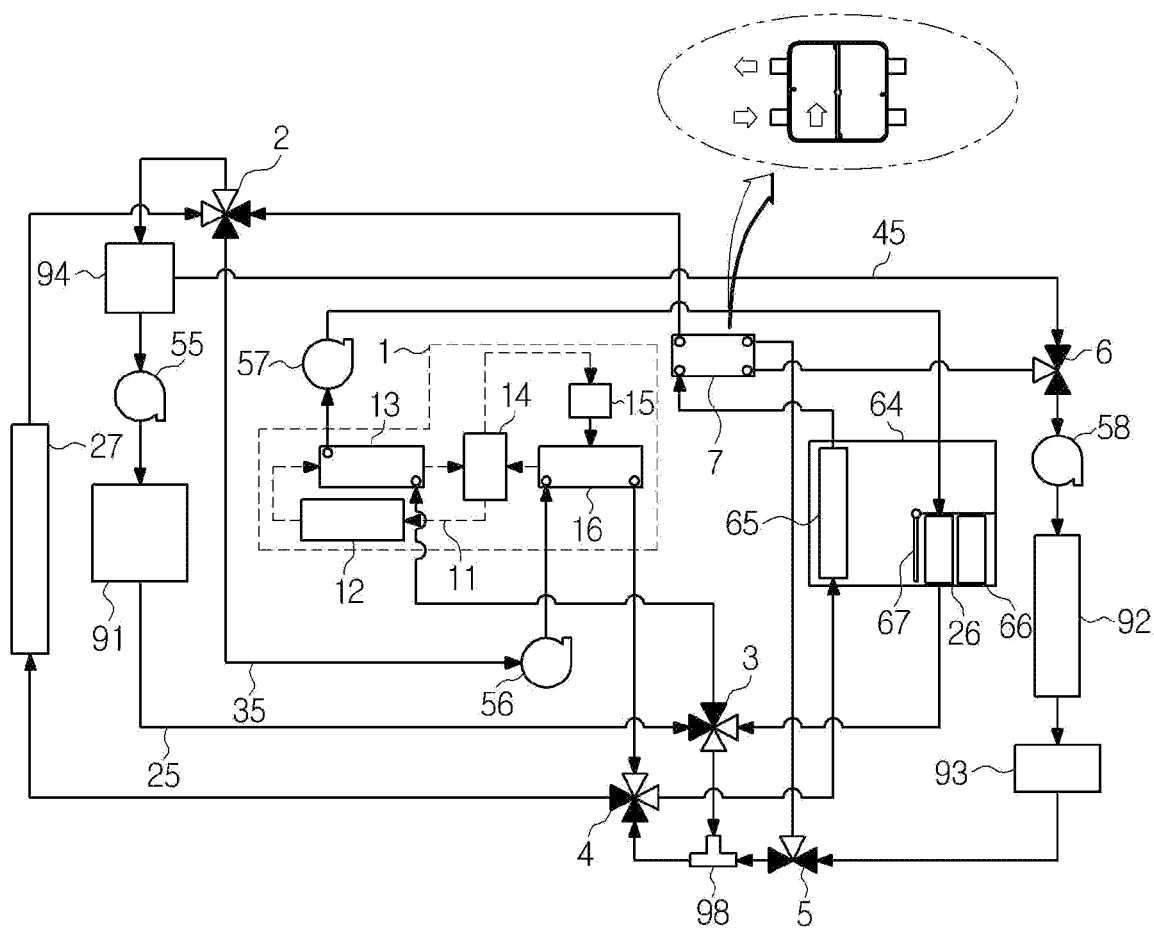
FIG. 4 illustrates a first operation mode of the vehicle thermal management system according to an embodiment of the present invention.
Figure 4:
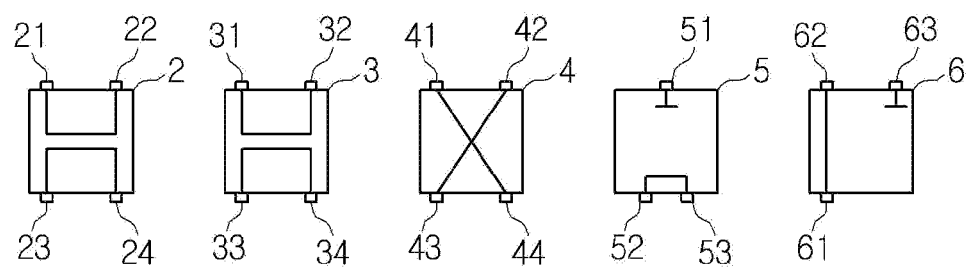

Referring to FIG. 4, in a first operational mode, the system cools the battery with the outside air while performing indoor cooling. The first valve 2 connects the radiator 27 and the electronic part 91, and connects the mixing tank 7 and the chiller 16. In addition, the second valve 3 connects the electronic part 91 and the condenser 13, and connects the heating heat exchanger 26 and the radiator 27. The third valve 4 connects the heating heat exchanger 26 and the radiator 27, and connects the chiller 16 and the cooling heat exchanger 65.

Furthermore, the mixing tank 7 connects the cooling heat exchanger 65 and the first valve 2, and the fourth valve 5 makes the coolant passing through the battery 92 flow to the radiator 27 after passing through the third valve 4. The fifth valve 6 makes the coolant passing through the radiator 27 flow to the battery 92, thereby cooling the battery with the outside air.

The coolant passing through the radiator 27 flows through the first valve 2 to the reserve tank 94, and a portion of the coolant circulates through the first pump 55, the electronic part 91, the second valve 3, the condenser 13, the second pump 57, the heating heat exchanger 26, the second valve 3, the connecting unit 98, the third valve 4, and the radiator 27 in order. In addition, the rest of the coolant flowing through the reserve tank 94 circulates through the third coolant line 45, the fifth valve 6, the fourth pump 58, the battery 92, the coolant heater 93, the fourth valve 5, the connecting unit 98, the third valve 4, and the radiator 27 in order. Moreover, the coolant passing through the cooling heat exchanger 65 circulates through the mixing tank 7, the first valve 2, the third pump 56, the chiller 16, and the third valve 4 in order.

Figure 5:
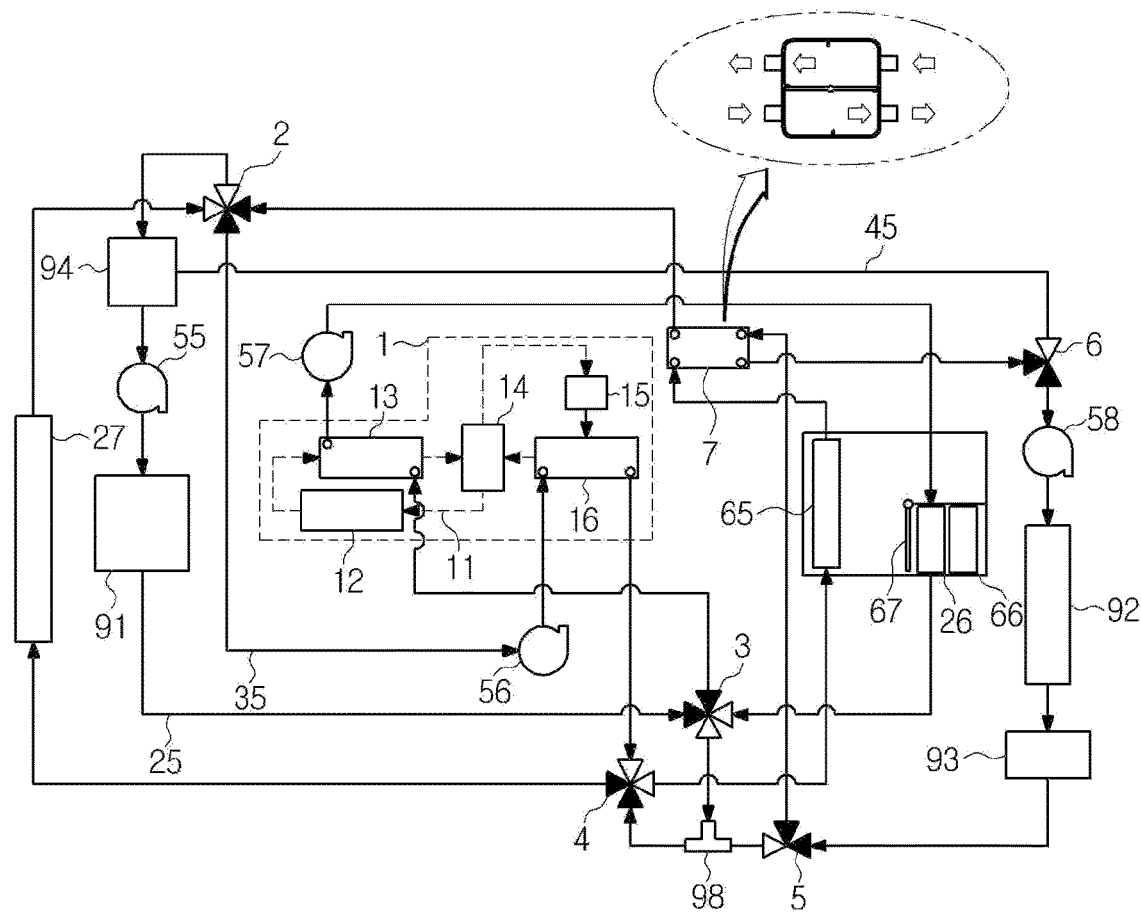
FIG. 5 illustrates a second operation mode of the vehicle thermal management system according to an embodiment of the present invention.
Figure 5:
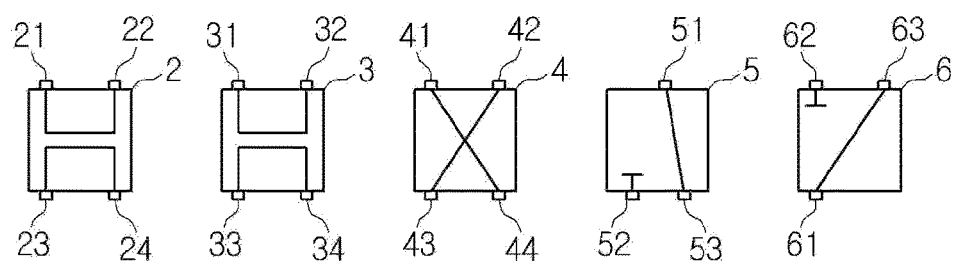

Referring to FIG. 5, In a second operational mode, the system cools the battery by the chiller while performing indoor cooling, or cools the battery by the chiller after turning off the indoor cooling. The first valve 2 connects the radiator 27 and the electronic part 91, and connects the mixing tank 7 and the chiller 16. The second valve 3 connects the electronic part 91 and the condenser 13, and connects the heating heat exchanger 26 and the radiator 27. The third valve 4 connects the heating heat exchanger 26 and the radiator 27, and connects the chiller 16 and the cooling heat exchanger 65.

In addition, the mixing tank 7 connects the first valve 2 and the fourth valve 5, and connects the cooling heat exchanger 65 and the fifth valve 6. The fourth valve 5 makes the coolant passing through the battery 92 flow into the mixing tank 7, and the fifth valve 6 makes the coolant passing through the mixing tank 7 flow into the battery 92, thereby cooling the battery 92 by the chiller 16.

The coolant passing through the radiator 27 flows through the first valve 2 into the reserve tank 94, and circulates through the first pump 55, electronic part 91, second valve 3, condenser 13, second pump 57, heating heat exchanger 26, second valve 3, connection unit 98, third valve 4, and radiator 27 in sequence. In addition, the coolant passing through the battery 92 circulates through the coolant heater 93, fourth valve 5, mixing tank 7, first valve 2, third pump 56, chiller 16, third valve 4, cooling heat exchanger 65, mixing tank 7, fifth valve 6, and fourth pump 58 in sequence.

In this case, in a case in which the heating rate of the battery 92 reaches the maximum value (Max), a blast fan on the cooling heat exchanger 65 side is turned off to turn off indoor cooling, and only cooling by the chiller 16 of the battery 92 is performed.

Figure 6:
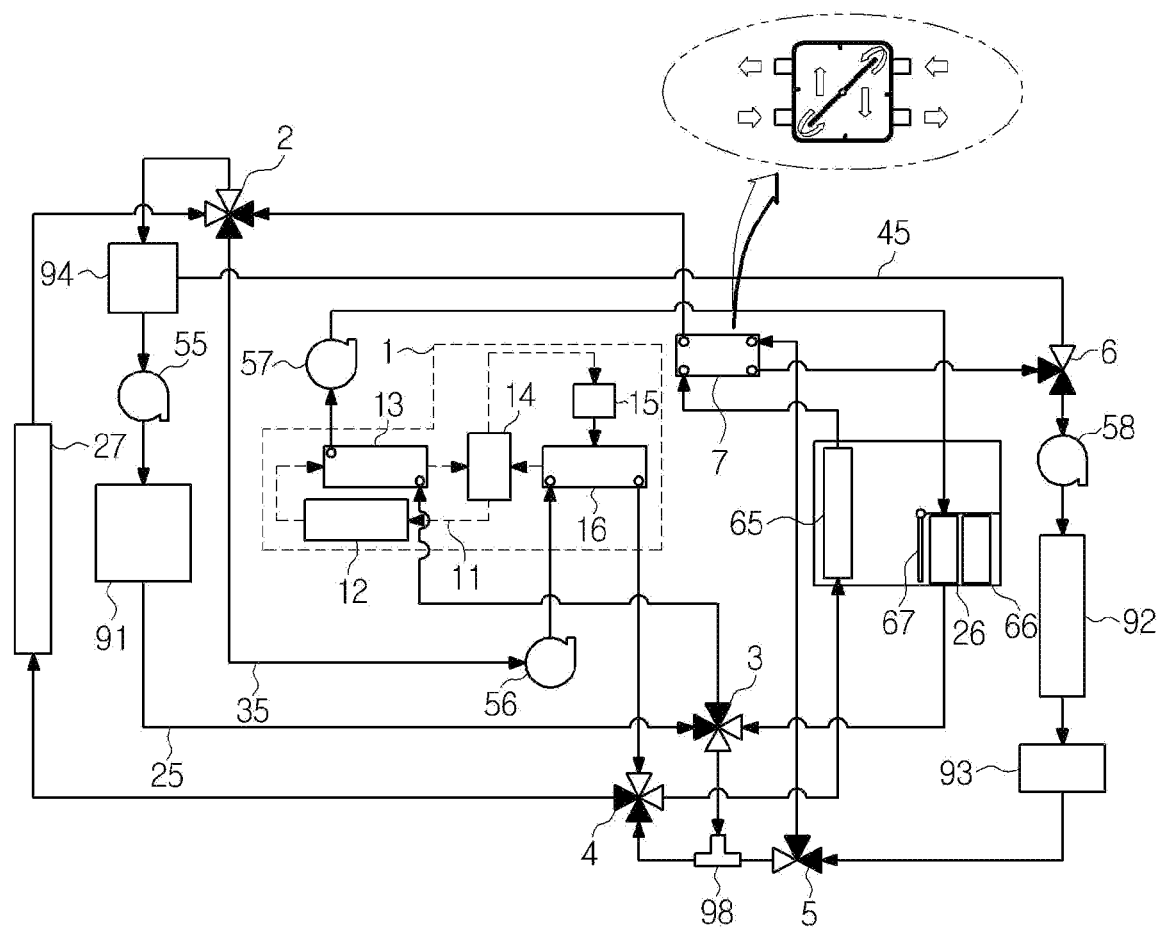
FIG. 6 illustrates a third operation mode of the vehicle thermal management system according to an embodiment of the present invention.
Figure 6:
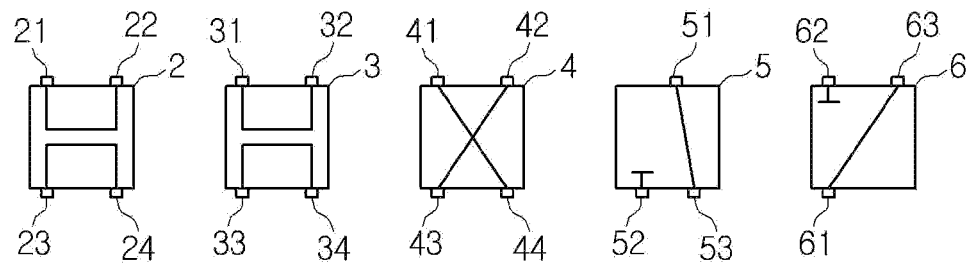

Referring to FIG. 6, in a third operational mode, the system cools the battery with the chiller and mixed coolant while performing indoor cooling. The first valve 2 connects the radiator 27 and the electronic part 91, and connects the mixing tank 7 and the chiller 16. The second valve 3 connects the electronic part 91 and the condenser 13, and connects the heating heat exchanger 26 and the radiator 27. The third valve 4 connects the heating heat exchanger 26 and the radiator 27, and connects the chiller 16 and the cooling heat exchanger 65.

Furthermore, the mixing tank 7 connects the first valve 2 and the fourth valve 5, and connects the cooling heat exchanger 65 and the fifth valve 6. A communication area of the first valve 2 and the fourth valve 5 and a communication area of the cooling heat exchanger 65 and the fifth valve 6 are mixed in the mixing tank 7, thereby cooling the battery 92 with mixed coolant.

The coolant passing through the radiator 27 flows through the first valve 2 to the reserve tank 94, and circulates through the first pump 55, the electronic part 91, the second valve 3, the condenser 13, the second pump 57, the heating heat exchanger 26, the second valve 3, the connection unit 98, the third valve 4, and the radiator 27 in order. In addition, the coolant passing through the battery 92 circulates through the coolant heater 93, the fourth valve 5, the mix tank 7, the fifth valve 6, and the fourth pump 58 in order. Furthermore, the coolant passing through the cooling heat exchanger 65 circulates through the mixing tank 7, the first valve 2, the third pump 56, the chiller 16, the third valve 4, and the cooling heat exchanger 65 in order. In this case, the coolant passing through the chiller 16 and the coolant passing through the battery 92 are mixed together in the mixing tank 7.

Figure 7:
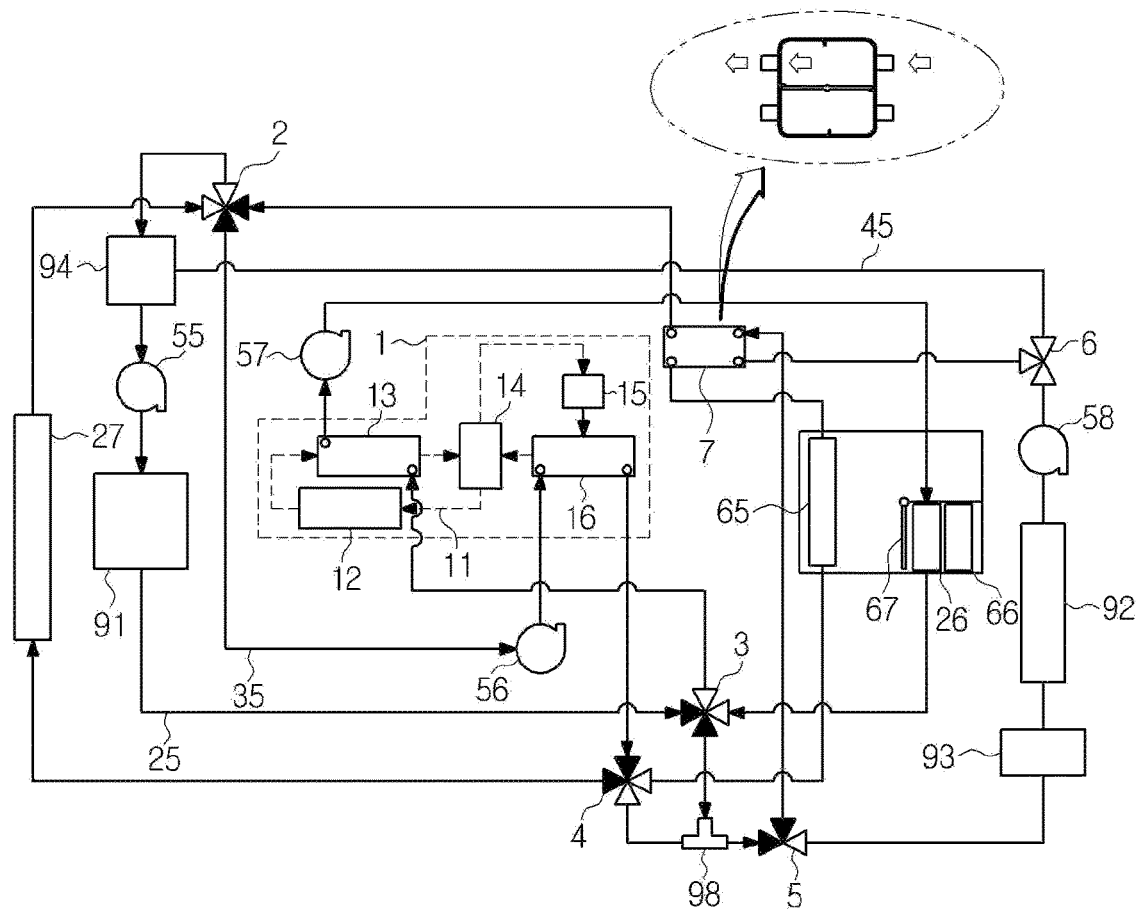
FIG. 7 illustrates a fourth operation mode of the vehicle thermal management system according to an embodiment of the present invention.
Figure 7:
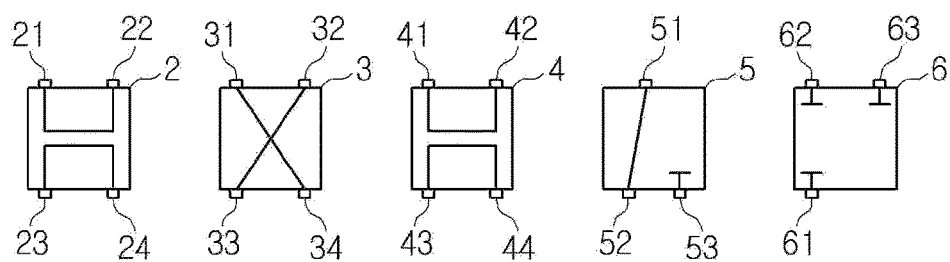

Referring to FIG. 7, in a fourth operational mode, the system absorbs heat of outdoor air and the electronic part while performing indoor heating. The first valve 2 connects the radiator 27 and electronic part 91, and connects the mixing tank 7 and chiller 16. Additionally, the second valve 3 connects the electronic part 91 and mixing tank 7, and connects the heating heat exchanger 26 and condenser 13.

The third valve 4 connects the chiller 16 and radiator 27, and connects the electronic part 91 and cooling heat exchanger 65.

Furthermore, the mixing tank 7 connects the first valve 2 and fourth valve 5, and the fourth valve 5 makes the coolant passing through the electronic part 91 flow through the second valve 3 into the mixing tank 7, thereby performing heat absorption through outdoor air and the electronic part.

The coolant passing through the radiator 27 flows through the first valve 2 to the reserve tank 94, and circulates through the first pump 55, the electronic part 91, the second valve 3, the connection unit 98, the fourth valve 5, the mixing tank 7, the first valve 2, the third pump 56, the chiller 16, the third valve 4, and the radiator 27 in order. Additionally, the coolant passing through the heating heat exchanger 26 circulates through the condenser 13, the second pump 57, and the heating heat exchanger 26 in order.

Figure 8:
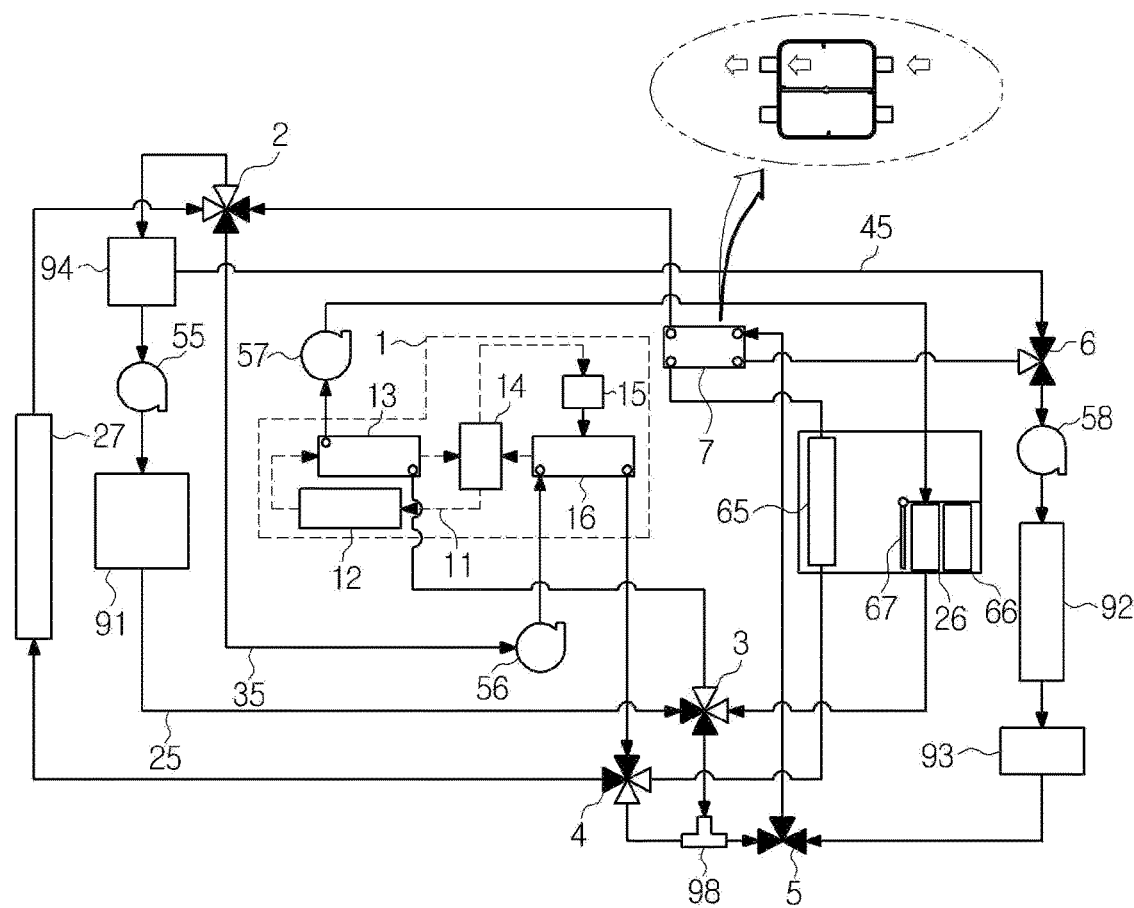
FIG. 8 illustrates a fifth operation mode of the vehicle thermal management system according to an embodiment of the present invention.
Figure 8:
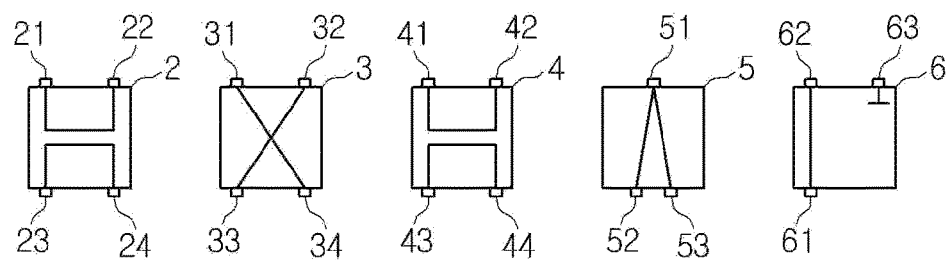

Referring to FIG. 8, in a fifth operational mode, the system absorbs heat of outdoor air, the electronic part and the battery while performing indoor heating. The first valve 2 connects the radiator 27 and electronic part 91, and connects the mixing tank 7 and chiller 16. Additionally, the second valve 3 connects the electronic part 91 and mixing tank 7, and connects the heating heat exchanger 26 and condenser 13. The third valve 4 connects the chiller 16 and radiator 27, and connects the electronic part 91 and cooling heat exchanger 65.

Furthermore, the mixing tank 7 connects the first valve 2 and fourth valve 5, and the fourth valve 5 makes the coolant passing through the electronic part 91 flow through the second valve 3 into the mixing tank 7, and makes the coolant passing through the battery 92 flow to the mixing tank 7, and the fifth valve makes the coolant passing through the radiator 27 flow to the battery 92, thereby performing heat absorption through outdoor air, the electronic part, and the battery.

The coolant passing through the radiator 27 flows through the first valve 2 to the reserve tank 94, and a portion of the coolant circulates through the first pump 55, the electronic part 91, the second valve 3, the connection unit 98, the fourth valve 5, the mixing tank 7, the first valve 2, the third pump 56, the chiller 16, the third valve 4, and the radiator 27 in order. Additionally, the rest of the coolant flowing to the reservoir tank 94 circulates through the fifth valve 6, the fourth pump 58, the battery 92, the coolant heater 93, the fourth valve 5, the mixing tank 7, the first valve 2, the third pump 56, the chiller 16, the third valve 4, and the radiator 27 in order through the third coolant line 45.

Figure 9:
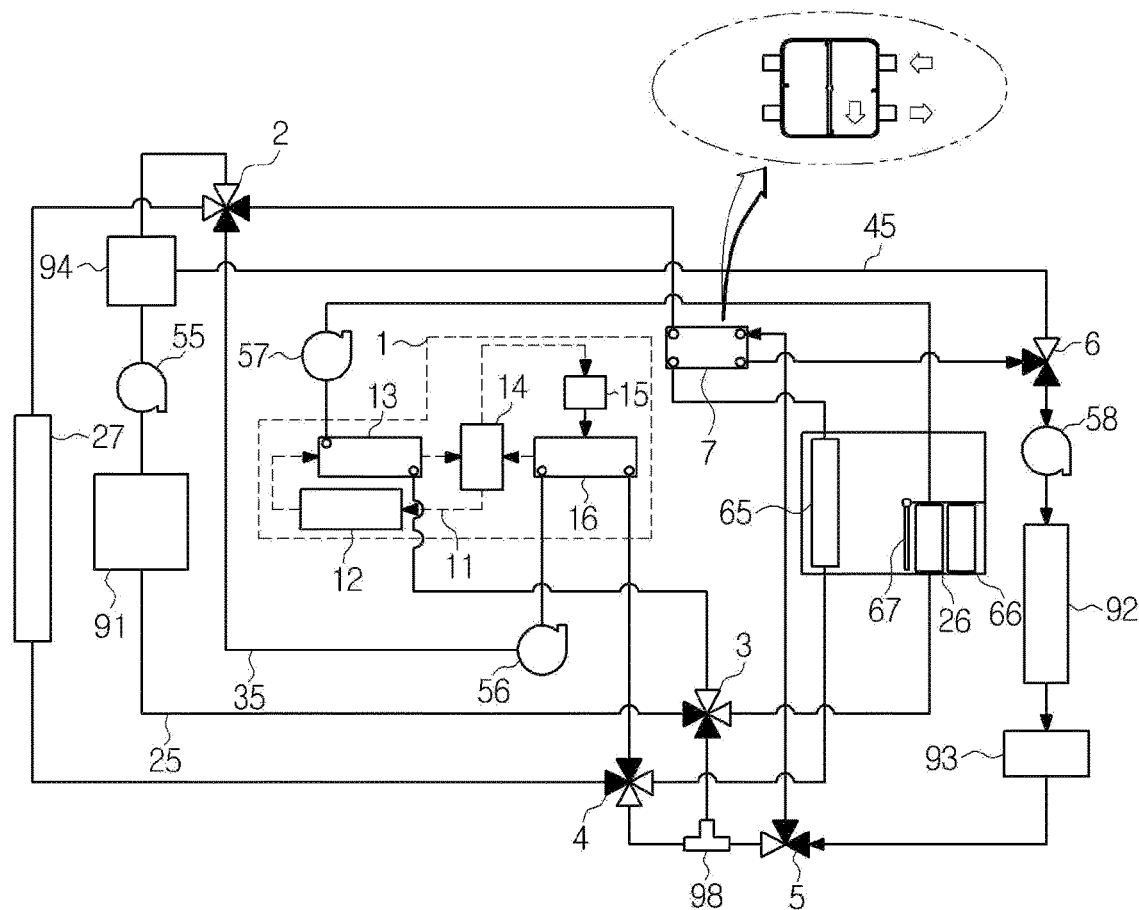
FIG. 9 illustrates a sixth operation mode of the vehicle thermal management system according to an embodiment of the present invention.
Figure 9:
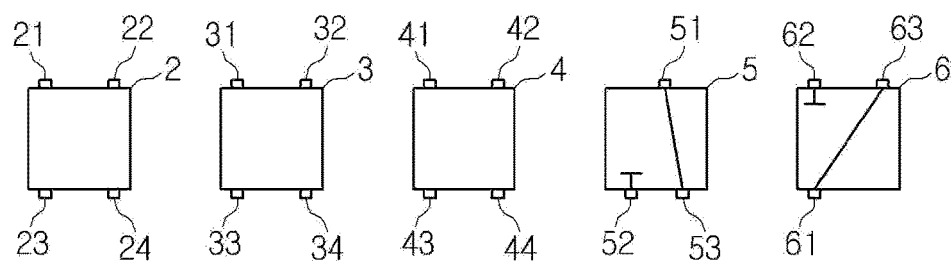

Referring to FIG. 9, a sixth operational mode is a battery warm-up mode in which only the coolant heater operates. The fourth valve 5 connects the battery 92 and the mixing tank 7, and the fifth valve 6 connects the mixing tank 7 and the battery 92. The mixing tank 7 connects the fourth valve 5 and the fifth valve 6. The coolant passing through the battery 92 circulates through the coolant heater 93, the fourth valve 5, the mixing tank 7, the fifth valve 6, the fourth pump 58, and the battery 92 in order. In this case, the operation of the refrigerant module 1 is turned off, and only the coolant heater 93 operates to warm up the battery 92.

Figure 10:
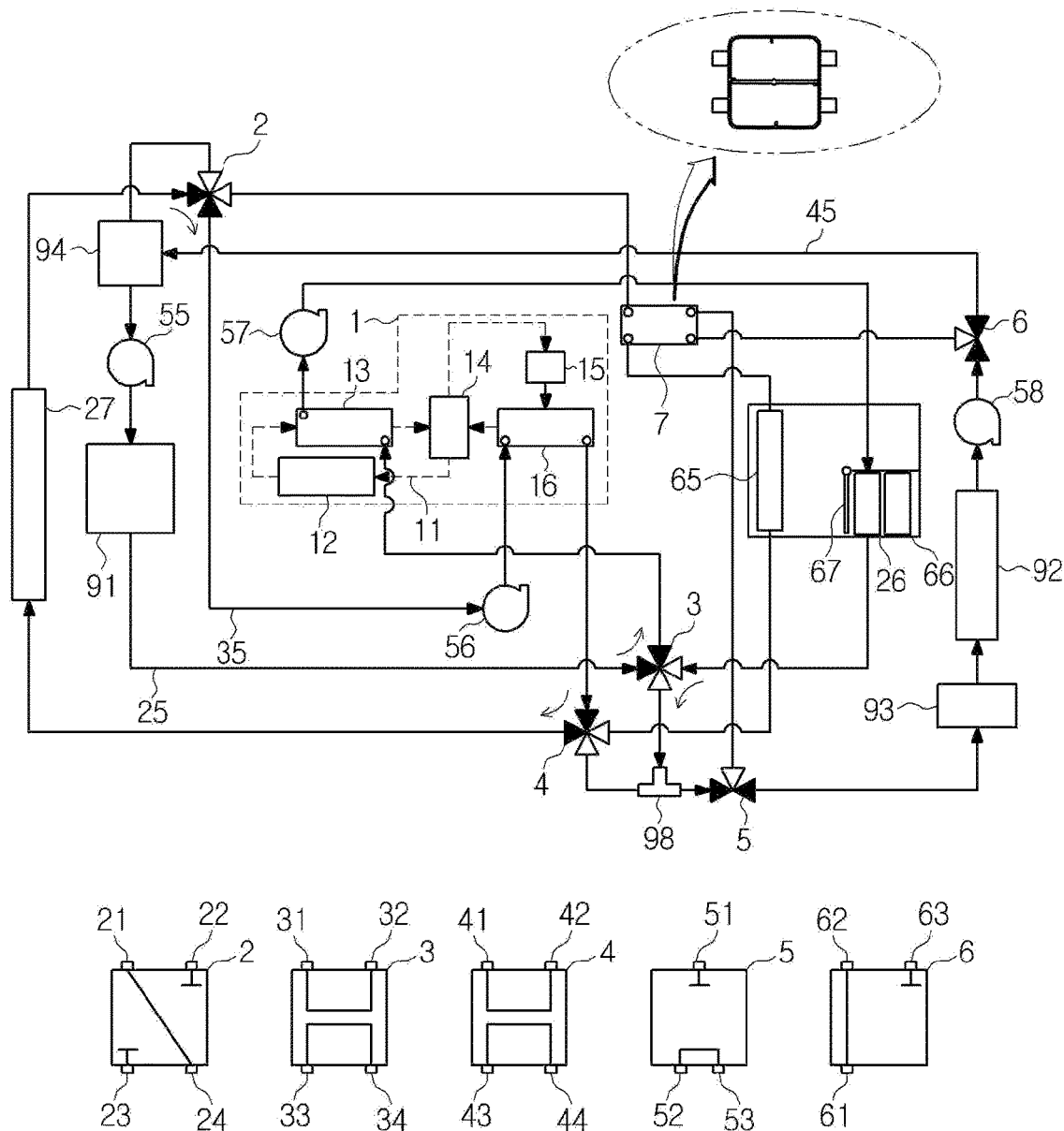
FIG. 10 illustrates a seventh operation mode of the vehicle thermal management system according to an embodiment of the present invention.

Referring to FIG. 10, a seventh operational mode is the battery warm-up mode in which the heat pump operates together. The first valve 2 connects the radiator 27 and the chiller 16, and the second valve 3 connects the electronic part 91 and the condenser 13, and connects the heating heat exchanger 26 and the battery 92. In addition, the third valve 4 connects the chiller 16 and the radiator 27. The fourth valve 5 connects the heating heat exchanger 26 and the battery 92, and the fifth valve 6 connects the battery 92 and the powertrain components 91.

The coolant passing through the radiator 27 circulates through the first valve 2, third pump 56, chiller 16, third valve 4, and radiator 27. In addition, the coolant passing through the heating heat exchanger 26 circulates through the second valve 3, the connecting unit 98, the fourth valve 5, the coolant heater 93, the battery 92, the fourth pump 58, the fifth valve 6, the reserve tank 94, the first pump 55, the electronic part 91, the second valve 3, the condenser 13, the second pump 57, and the heating heat exchanger 26 in order.

Figure 11:
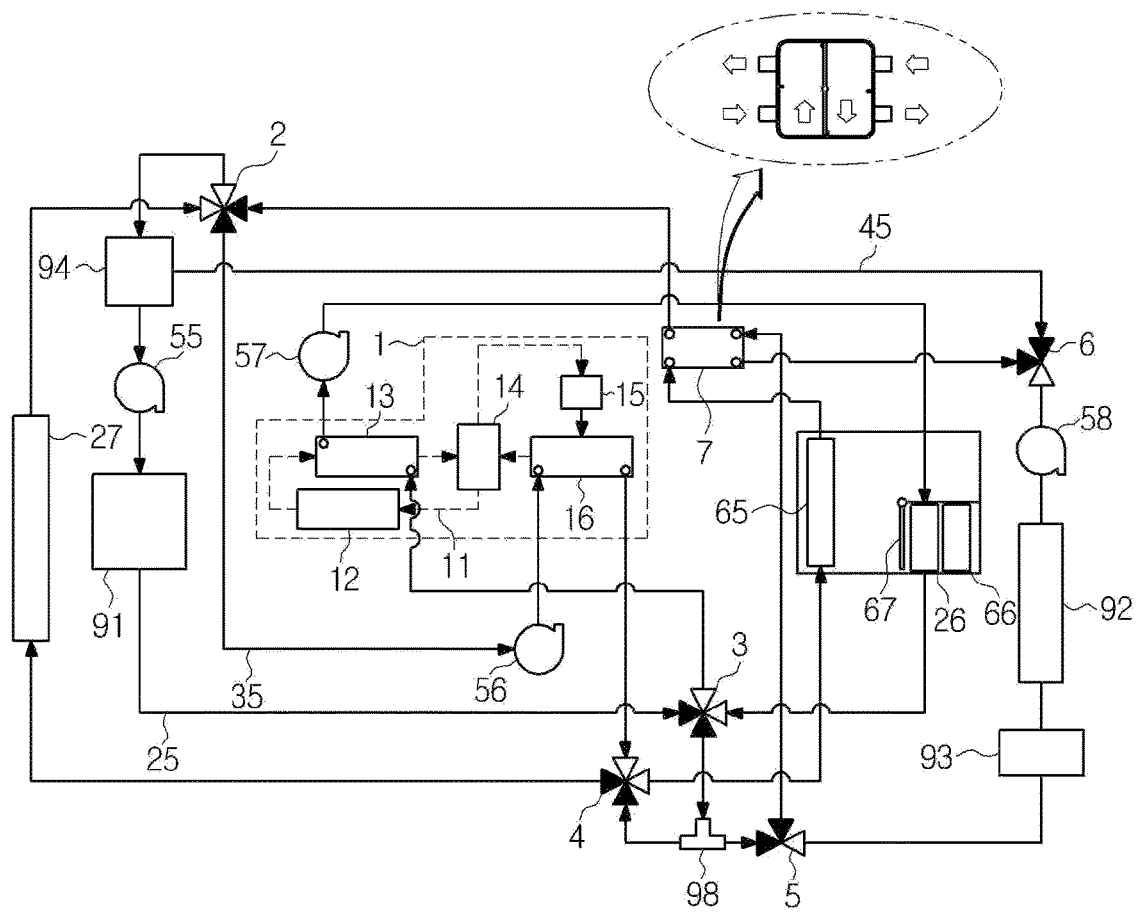
FIG. 11 illustrates an eighth operation mode of the vehicle thermal management system according to an embodiment of the present invention.
Figure 11:
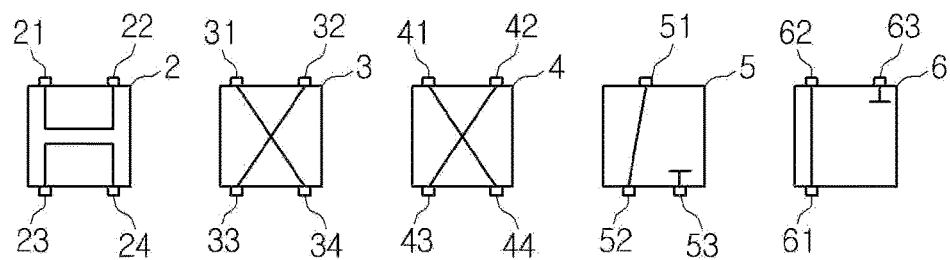

Referring to FIG. 11, an eighth operational mode is a dehumidifying heating mode in winter. The first valve 2 connects the radiator 27 and the reserve tank 94, and connects the mixing tank 7 and the chiller 16. The second valve 3 connects the electronic part 91 and the connecting unit 98, and connects the heating heat exchanger 26 and the condenser 13. The third valve 4 connects the connecting unit 98 and the radiator 27, and connects the chiller 16 and the cooling heat exchanger 65.

In addition, the mixing tank 7 connects the cooling heat exchanger 65 and the first valve 2, and connects the fourth valve 5 and the fifth valve 6. The fourth valve 5 makes the coolant passing through the connecting unit 98 flow into the mixing tank 7, and the fifth valve 6 makes the coolant passing through the mixing tank 7 flow into the reserve tank 94.

The coolant passing through the radiator 27 flows to the first valve 2, the reserve tank 94, the first pump 55, the electronic part 91, the second valve 3, and the connecting unit 98. A portion of the coolant in the connecting unit 98 circulates through the radiator 27 through the third valve 4. The rest circulates through the fourth valve 5, the mixing tank 7, the fifth valve 6, the reserve tank 94, the first pump 55, the electronic part 91, the second valve 3, and the connecting unit 98. In addition, the coolant passing through the heating heat exchanger 26 circulates through the second valve 3, the condenser 13, the second pump 57, and the heating heat exchanger 26.

Figure 12:
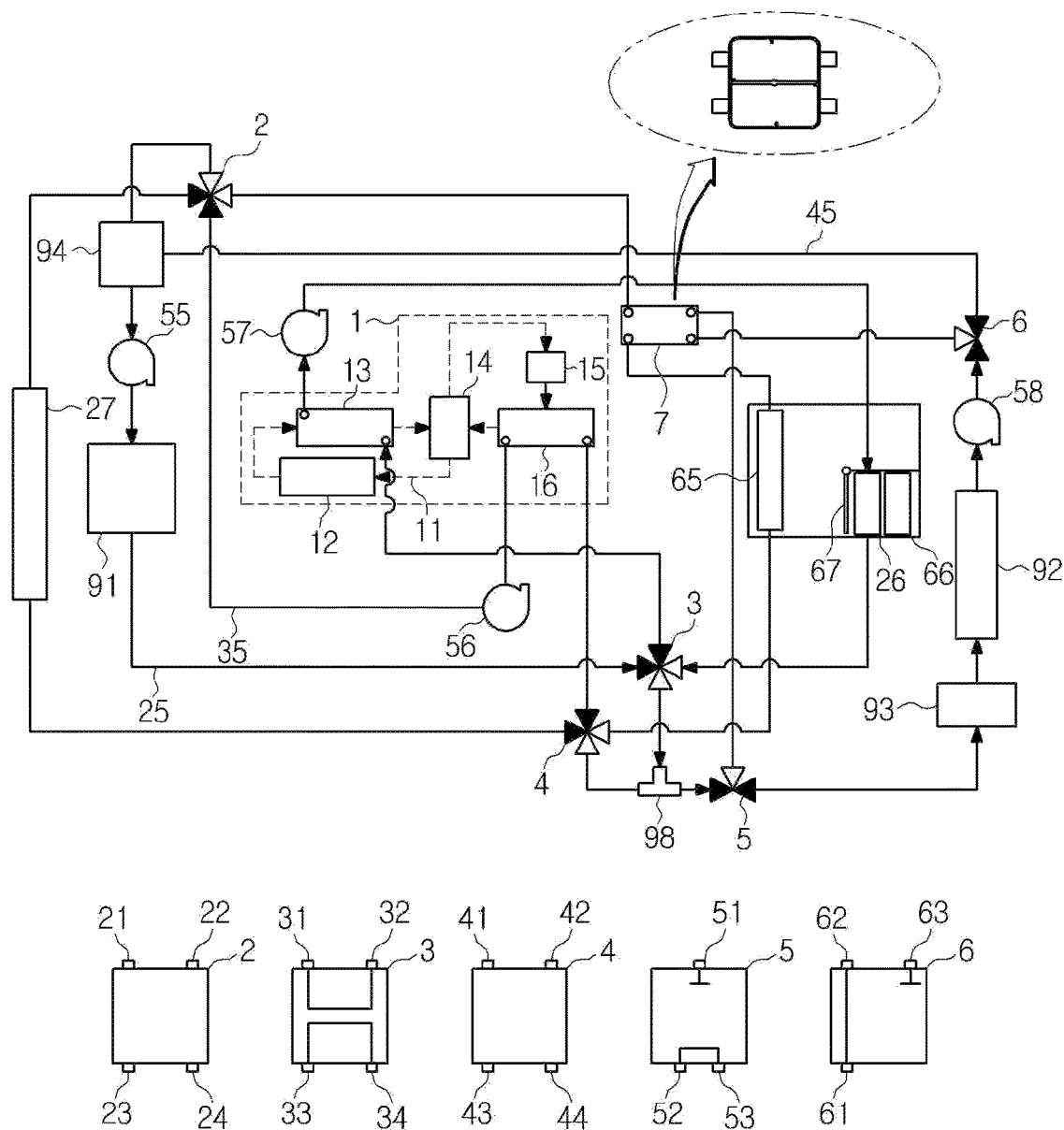
FIG. 12 illustrates a ninth operation mode of the vehicle thermal management system according to an embodiment of the present invention.

Referring to FIG. 12, a ninth operational mode is a waste heat heating mode, where the heat pump is turned off. The second valve 3 connects the electronic part 91 and the condenser 13, and connects the heating heat exchanger 26 and the connecting unit 98. The fourth valve 5 connects the connecting unit 98 and the battery 92, and the fifth valve 6 connects the battery 92 and the electronic part 91. The coolant passing through the electronic part 91 circulates through the second valve 3, the condenser 13, the second pump 57, the heating heat exchanger 26, the second valve 3, the connecting unit 98, the fourth valve 5, the coolant heater 93, the battery 92, the fourth pump 58, the fifth valve 6, the reserve tank 94, and the first pump 55.

Through the disclosed configuration, the present invention enables cooling, heating, and dehumidification of the interior of the vehicle, as well as cooling and heat absorption of the electronic part 91 and cooling of the battery 92. Depending on the operational modes, the mixing tank 7 is configured in such a way that the flow passages therein are partitioned or coolant is mixed. Furthermore, the vehicle thermal management system can reduce power consumption of an electric compressor since including an actively controlled individual cooling system based on a heat generation rate of the battery.

Furthermore, the system can deflate by expanding and contracting according to a change in temperature of coolant in a specific operation mode due to the configuration of a mixing tank. Additionally, the system according to the present invention can simplify the configuration of the refrigerant line, and secure price competitiveness by reducing the number of heat exchangers and refrigerant valves.

Meanwhile, the system according to the present invention can improve heating performance of the heat pump since the water-cooled evaporator performs outdoor heat absorption and the chiller performs waste heat absorption of the electronic parts and the battery during the heating operation of the heat pump. In addition, the system according to the present invention can heat the interior of the vehicle only with waste heat of the electronic parts and the battery, and warm up the battery through the heat pump.

Although exemplary embodiments of the vehicle thermal management system according to the present invention have been described with reference to the drawings, it will be understood by those skilled in the art that various modifications and alternative embodiments can be made without departing from the scope of the appended claims, which define the technical scope of the invention.

The invention claimed is:

1. A vehicle thermal management system comprising:
   a heating heat exchanger which exchanges heat with air within an air-conditioning case to heat the air, and a cooling heat exchanger which exchanges heat with air to cool the air;
   a refrigerant line circulating through a compressor, a condenser, an expansion valve, and a chiller;
   a first coolant line containing a coolant that passes through the heating heat exchanger and exchanges heat with the condenser of the refrigerant line;
   a second coolant line further containing the coolant that passes through the cooling heat exchanger and exchanges heat with the chiller of the refrigerant line;
   a radiator;
   a third coolant line further containing the coolant, the third coolant line passes through the radiator such that the radiator exchanges heat between the coolant and the outside air, and wherein the radiator exchanges heat with a battery of a vehicle;
   a mixing tank provided to mix the coolant of the first coolant line, the second coolant line, and the third coolant line; and
   wherein the mixing tank is a single unit that integrates a coolant storage function and a valve function.

2. The vehicle thermal management system of claim 1, wherein the mixing tank mixes the coolant depending on operational modes in a case in which a coolant temperature of a battery side of the mixing tank and a coolant temperature of a chiller side of the mixing tank are different.

3. The vehicle thermal management system of any one of claim 1, wherein the first coolant line passes through an electronic part of the vehicle.

4. The vehicle thermal management system of claim 3, further comprising:
   a first valve located among the radiator, the electronic part, the mixing tank, and the chiller, wherein the first valve makes the coolant passing through the radiator selectively flow to the electronic part or the chiller, or makes the coolant passing through the mixing tank selectively flow to the chiller or the electronic part.

5. A vehicle thermal management system comprising:
   a heating heat exchanger which exchanges heat with air within an air-conditioning case to heat the air, and a cooling heat exchanger which exchanges heat with air to cool the air;
   a refrigerant line circulating through a compressor, a condenser, an expansion valve, and a chiller;

a first coolant line containing a coolant that passes through the heating heat exchanger and exchanges heat with the condenser of the refrigerant line;
a second coolant line further containing the coolant that passes through the cooling heat exchanger and exchanges heat with the chiller of the refrigerant line;
a radiator;
a third coolant line further containing the coolant, the third coolant line passes through the radiator such that the radiator exchanges heat between the coolant and the outside air, and wherein the radiator exchanges heat with a battery of a vehicle;
a mixing tank provided to mix the coolant of the first coolant line, the second coolant line, and the third coolant line;
wherein the first coolant line passes through an electronic part of the vehicle;
a first valve located among the radiator, the electronic part, the mixing tank, and the chiller, wherein the first valve makes the coolant passing through the radiator selectively flow to the electronic part or the chiller, or makes the coolant passing through the mixing tank selectively flow to the chiller or the electronic part; and
a second valve provided among the electronic part, the condenser, the heating heat exchanger, and the radiator, wherein the second valve makes the coolant passing through the electronic part selectively flow to the condenser or the mixing tank, or makes the coolant passing through the heating heat exchanger selectively flow to the radiator or the condenser.

6. The vehicle thermal management system of claim 5, further comprising:
a third valve provided among the second valve, the radiator, the chiller, and the cooling heat exchanger, wherein the third valve makes the coolant passing through the second valve selectively flow to the radiator or the cooling heat exchanger, or makes the coolant passing through the chiller selectively flow to the cooling heat exchanger or the radiator.

7. The vehicle thermal management system of claim 6, further comprising:
a fourth valve provided among the mixing tank, the second valve, the third valve, and the battery, wherein the fourth valve makes the coolant passing through the battery selectively flow to the third valve or the mixing tank, or makes the coolant passing through the second valve selectively flow to the mixing tank or the battery.

8. The vehicle thermal management system of claim 7, further comprising:
a fifth valve provided among the battery, the first valve, the electronic part, and the mixing tank, wherein the fourth valve makes the coolant passing through the first valve flow to the battery, or makes the coolant passing through the mixing tank selectively flow to the battery or the electronic part, or makes the coolant passing through the battery flow to the electronic part.

9. The vehicle thermal management system of claim 8, wherein the mixing tank is connected to the cooling heat exchanger, the first valve, the fourth valve, and the fifth valve, and has a door rotating inside, and
wherein depending on the rotation of the door, the flow passages inside the mixing tank are divided or connected, performing a coolant mixing function and a passage switching function.

10. The vehicle thermal management system of claim 9, wherein depending on the rotation of the door, the cooling heat exchanger and the first valve are communicated, or the fourth valve and the fifth valve are communicated, or the first valve and the fourth valve are communicated, or the cooling heat exchanger and the fifth valve are communicated, or the cooling heat exchanger, the first valve, the fourth valve, and the fifth valve are all communicated.

11. The vehicle thermal management system of claim 9, wherein in an indoor cooling mode, the first valve connects the radiator and the electronic part, and connects the mixing tank and the chiller, the second valve connects the electronic part and the condenser, and connects the heating heat exchanger and the radiator, the third valve connects the heating heat exchanger and the radiator, and connects the chiller and the cooling heat exchanger, and
wherein the mixing tank connects the cooling heat exchanger and the first valve, the fourth valve makes the coolant passing through the battery flow to the radiator after passing the third valve, and the fifth valve makes the coolant passing through the radiator flow to the battery, thereby cooling the battery with outside air.

12. The vehicle thermal management system of claim 9, wherein in an indoor cooling mode, the first valve connects the radiator and the electronic part, and connects the mixing tank and the chiller, the second valve connects the electronic part and the condenser, and connects the heating heat exchanger and the radiator, the third valve connects the heating heat exchanger and the radiator, and connects the chiller and the cooling heat exchanger, and
wherein the mixing tank connects the first valve and the fourth valve, and connects the cooling heat exchanger and the fifth valve, the fourth valve makes the coolant passing through the battery flow to the mixing tank, and the fifth valve makes the coolant passing through the mixing tank flow to the battery, thereby cooling the battery with the chiller.

13. The vehicle thermal management system of claim 12, wherein the mixing tank connects the first valve and the fourth valve, and connects the cooling heat exchanger and the fifth valve, wherein a communication area of the first valve and the fourth valve and a communication area of the cooling heat exchanger and the fifth valve are mixed, thereby cooling the battery with mixed coolant.

14. The vehicle thermal management system of claim 9, wherein in an indoor heating mode, the first valve connects the radiator and the electronic part, and connects the mixing tank and the chiller, the second valve connects the electronic part and the mixing tank, and connects the heating heat exchanger and the condenser, the third valve connects the chiller and the radiator, and connects the electronic part and the cooling heat exchanger, and
wherein the mixing tank connects the first valve and the fourth valve, and the fourth valve makes the coolant passing through the electronic part flow into the mixing tank after passing the second valve, thereby absorbing heat through the outside air and the electronic part.

15. The vehicle thermal management system of claim 9, wherein in an indoor heating mode, the first valve connects the radiator and the electronic part, and connects the mixing tank and the chiller, the second valve connects the electronic part and the mixing tank, and connects the heating heat exchanger and the condenser, the third valve connects the chiller and the radiator, and connects the electronic part and the cooling heat exchanger, and
wherein the mixing tank connects the first valve and the fourth valve, and the fourth valve makes the coolant passing through the electronic part flow into the mixing tank after passing the second valve, makes the coolant passing through the battery flow to the mixing tank, and the fifth valve makes the coolant passing through the radiator flow to the battery, thereby absorbing heat through the outside air, the electronic part, and battery.

\* \* \* \* \*